UNITED STATES PATENT OFFICE.

BERNHARD SCHEID, OF FRANKFORT-ON-THE-MAIN, GERMANY.

PROCESS OF MANUFACTURING METALLIC SILICIUM.

SPECIFICATION forming part of Letters Patent No. 662,548, dated November 27, 1900.

Application filed September 9, 1899. Serial No. 730,024. (No specimens.)

*To all whom it may concern:*

Be it known that I, BERNHARD SCHEID, a subject of the Emperor of Germany, and a resident of Frankfort-on-the-Main, Germany, have invented certain new and useful Improvements in the Manufacture of Metallic Silicium, of which the following is a specification.

According to Moissan, by heating a mixture of rock-crystal and powdered carbon in a carbon-cylinder (*vide* pages 261 to 263 of his work *Le Four Électrique*) there is invariably obtained silicon mixed with silicon carbid, the silicon carbid predominating in the same proportion in which the substances to be so heated were mixed. This indicates that Moissan did not succeed in producing silicon free from silicon carbid. Again, Moissan says in the portion of his work above referred to that "this process might be utilized in the production of silicon by cooling the 'silicon-vapor' the moment it is evolved." Now this statement accounts for the difficulty attending the preparation of silicon, for at the moment it forms it becomes volatilized in the condition of vapor. As a matter of fact, by heating a close mixture of quartz-sand, divided as finely as possible, and carbon in an electric furnace, and notwithstanding any precautions that may be taken, such as moderating or entirely checking the draft or maintaining a deep layer of material in the furnace for the protection of the silicon, but a very small amount of silicon in the metallic state—say from two to three grams per kilowatt hour—is obtained, so that by this method the actual manufacture (for the market) of silicon would not only fail to offer any advantage, but would be altogether out of the question. Furthermore, the mixture of silicic acid and carbon becomes dissociated at the temperature prevailing in the electric furnace, the carbon being partially burned out and ejected according as mixture is superadded, so that the mass no longer retains its composition as expressed in the chemical equation when it comes within reach of the luminous arc, while if the operations should be interrupted or discontinued the mixture remaining behind in the furnace cannot be used afresh when the furnace is next started. Now I have elaborated a process which obviates the drawbacks mentioned—viz., the formation of silicon carbid simultaneously with the silicon itself, the volatilization of the silicon the instant it is formed, and the dissociation of the raw materials originally mixed. By this process, in fact, there is obtained a pure product and one that may justly be described as free from carbid— namely, silicon in the metallic state containing but a few hundredths parts of carbon and a few per cent. of iron and aluminium, respectively, both of which emanate from the electrode or furnace material and constitute but unimportant impurities, which where very pure materials are employed may be eliminated down to a few tenths per cent.

To sixty grams of silicic acid and twenty-four grams of carbon, being the quantities calculated in accordance with the equation $SiO_2 + 2C = Si + 2CO$, I add from five to thirty per cent., by weight—viz., the weight of the silicic acid used—of an acid, neutral, or basic silicate of the alkalies, alkaline earths, or earths by very intimately mixing the following raw materials or ingredients reduced to the state of as fine a powder as possible, viz: quartz, carbon, and, say, acid-soluble glass, in the proportions above stated. Thus, for example, sixty kilograms of quartz and twenty-four kilograms of carbon are thoroughly mixed in a ball-mill with from three to eighteen kilograms of a sodium-soluble glass according to the formula $Na_2Si_3O_7$, which corresponds to a proportion of about seventy-five per cent. of $SiO_2$ and twenty-five per cent. of $Na_2O$, or neutral silicates, say after the formula $Na_4SiO_4$, or a basic silicate, such as $Na_6SiO_5$, may be used without any fear of its affecting the ultimate result. Also the acid, neutral, or basic silicates of the alkaline earths or earths, say, of aluminium may be equally successfully employed.

In the practical operation of the furnace the use of acid-soluble glass, as noted by the above formula $Na_2Si_3O_7$, has proved most advantageous, such soluble glass being added in the proportion of from six to eight kilograms to every sixty kilograms of powdered quartz and every twenty-four kilograms of carbon.

By adding more silicate, if desired, the yield in silicon will be increased, though in that case the partial evaporation of the alkalies will prove to be an extremely objectionable and disturbing feature. Hence the proportions indicated above are recommended as preferable, though by no means binding, as they are supposed merely to apply to the general requirements of practice. One result of this addition of a silicate is that the silicon produced is at the moment of its formation absorbed by the melted silicate, though neither itself nor the melted silicate exercises any action upon each other, so that it is effectively protected from volatilization. The silicon-vapor as it is evolved gets outside the range of the electrode or the luminous arc and is condensed and taken up by the liquid melted silicate surrounding it, the temperature of which is considerably lower than that prevailing in the adjacent arc zone, so that a volatilization of the silicon continuously forming is checked while it is collected or enriched (as the case may be) in the melted silicate, acting as an absorbing medium, provided always that care is taken constantly to have an adequate amount of such absorbing or storing material in the vicinity of the arc sphere. The utility of the current is by such means multiplied eight or ten fold and raised to about thirty per cent. Also, owing to the addition of a silicate, the formation of silicon carbid simultaneously with that of the silicon is with certainty avoided, inasmuch as the carbon added, unless it happens to meet a particle of silicon before reaching the zone of reduction, has no opportunity to combine with the silicon produced and to form therewith silicon carbid, for in the first place the silicon is immediately absorbed by the silicate, while any carbid that may form at the same time is at once reduced by the said silicate, (the alkaline oxid of the silicate being meantime reduced into metal of the alkali, and the silicate will become reduced to or decomposed into silicon proportionately to the amount of silicic acid in the silicate, the final result being silicon and escaping carbonic oxid, CO.) In the second place a local excess of carbon is immediately oxidized by the added silicate. Further, the decomposition or dissociation of the mixture of $SiO_2$ and C is entirely obviated by the addition of the acid, neutral, or basic silicates, the carbon becoming enveloped in the readily fusible and caking mass of silicate, and thereby protected from oxidation. Hence even after an interruption of operations the raw material, although it has already undergone reaction, may be employed anew without the necessity of adding one or the other of the components to the mixture to restore the required proportion. The high temperature requisite for the reaction may be insured by working either on the arc principle or by resistance-heating. It will of course be understood that it is immaterial whether an alternating or a continuous current is used in the performance of the process.

The employment of other compounds in lieu of silicates is not practicable, because the haloid salts, evaporating very readily, as they do, render it impossible to carry on operations on a large scale, while the oxygen salts will either enter into extremely volatile compounds with the Si, like the sulfur or phosphorus salts, or, by combining with the silicon, form bodies utterly worthless to industry, like the salt of boracic acid.

The following equations may serve to illustrate the several instances here given, though they must be understood to be by no means exclusive or binding upon me:

I. $SiO_2 + Na_2Si_3O_7 + 6C = 3SiNa_2SiO_3 + 6CO$.
II. $2SiO_2 + 2Na_2SiO_3 + 6C = 3Si + Na_4SiO_4 + 6CO$.
III. $2SiO_2 + 3Na_4SiO_4 + 6C = 3Si + 2Na_8SiO_5 + 6CO$.
IV. $2SiO_2 + 4Na_6SiO_5 + 6C = 3Si + 3Na_8SiO_6 + 6CO$.

About one hundred kilograms of crystalline silicon has already been manufactured by this process for the trade on a large scale, the final product containing about ninety-nine per cent. of pure silicon with (as mentioned before) a few hundredths per cent. of carbon. So that, assuming that the operation of the furnace is properly conducted and regulated, from about twenty-five to thirty grams of silicon in the metallic state may be obtained with ease per kilowatt hour.

What I claim is—

The process of manufacturing crystallized silicon which consists in mixing silicic acid, carbon, and a silicate of the alkalies, alkaline earths, or earths, and heating the mixture to such a temperature and under such conditions as to cause the production of silicon and avoid its volatilization and the formation of silicon carbid simultaneously therewith.

In testimony whereof I have signed my name to this specification in the presence of two subscribing witnesses.

BERNHARD SCHEID.

Witnesses:
MAX MEYER,
CARL SEIFERT